United States Patent [19]
Schmidt et al.

[11] Patent Number: 4,892,565
[45] Date of Patent: * Jan. 9, 1990

[54] ADSORPTIVE SEPARATION UTILIZING MULTIPLE ADSORPTION BEDS

[75] Inventors: William P. Schmidt; Ravi Kumar; Alan D. Abel, all of Allentown, Pa.

[73] Assignee: Air Products and Chemicals, Inc., Allentown, Pa.

[*] Notice: The portion of the term of this patent subsequent to Mar. 21, 2006 has been disclaimed.

[21] Appl. No.: 285,468

[22] Filed: Dec. 16, 1988

Related U.S. Application Data

[63] Continuation-in-part of Ser. No. 138,983, Dec. 29, 1987, Pat. No. 4,813,977.

[51] Int. Cl.$^4$ .............................................. B01D 53/04
[52] U.S. Cl. .......................................... 55/26; 55/31; 55/33; 55/58; 55/62; 55/68; 55/74; 55/75
[58] Field of Search .................. 55/21, 25, 26, 31, 33, 55/35, 58, 62, 68, 73, 74, 75

[56] References Cited

U.S. PATENT DOCUMENTS

| | | | |
|---|---|---|---|
| 3,313,091 | 4/1967 | Berlin | 55/58 |
| 3,338,030 | 8/1967 | Feldbauer, Jr. | 55/25 |
| 3,564,816 | 2/1971 | Batta | 55/26 |
| 3,638,398 | 2/1972 | Domine et al. | 55/25 |
| 3,923,477 | 12/1975 | Armond et al. | 55/25 |
| 3,957,463 | 5/1976 | Drissel et al. | 55/25 |
| 4,000,990 | 4/1977 | Bingham | 55/30 |
| 4,013,429 | 3/1977 | Sircar et al. | 55/33 |
| 4,077,779 | 3/1978 | Sircar et al. | 55/25 |
| 4,144,037 | 3/1979 | Armond et al. | 55/58 |
| 4,144,038 | 3/1979 | Armond | 55/58 |
| 4,168,149 | 9/1979 | Armond et al. | 55/21 |
| 4,222,750 | 9/1980 | Gauthier et al. | 55/58 |
| 4,264,340 | 4/1981 | Sircar et al. | 55/25 |
| 4,477,265 | 10/1984 | Kumar et al. | 55/26 |
| 4,539,019 | 9/1985 | Koch | 55/33 X |
| 4,614,525 | 9/1986 | Reiss | 55/58 X |
| 4,705,541 | 11/1987 | Sircar | 55/26 |
| 4,711,645 | 12/1987 | Kumar | 55/33 X |
| 4,770,676 | 9/1988 | Sircar et al. | 55/26 |
| 4,813,977 | 3/1989 | Schmidt et al. | 55/26 |

FOREIGN PATENT DOCUMENTS

| | | | |
|---|---|---|---|
| 61-216712 | 9/1986 | Japan | 55/25 |
| 1437344 | 5/1976 | United Kingdom | 55/25 |

Primary Examiner—Robert Spitzer
Attorney, Agent, or Firm—Geoffrey L. Chase; James C. Simmons; William F. Marsh

[57] ABSTRACT

A process is described for recovery of a more selectively adsorbed key component from a gas mixture containing the key component and one or more less selectively adsorbed secondary components using vacuum swing adsorption. The process minimizes capital costs by reducing or eliminating gas storage vessels and reduces power requirements by operating without a feed compressor or elevated pressure feed, whereby feed is induced at least in part by vacuum conditions achieved by pressure equalization between parallel adsorption beds. Alternatively, at least a minor amount of less selectively adsorbed secondary component roduct can be recovered.

28 Claims, 3 Drawing Sheets

FOUR BED VSA

THREE BED VSA

FIG. 3A

THREE BED CYCLE

| 140 | FEED | RINSE | EVACUATION | REPRESS | IDLE |
|---|---|---|---|---|---|
| 142 | REPRESS | IDLE | FEED | RINSE | EVACUATION |
| 144 | EVACUATION | | REPRESS | IDLE | FEED | RINSE |

TIME ⟶

FIG. 3B

FOUR BED CYCLE

| 58 | FEED | RINSE | EVACUATION | REPRESS |
|---|---|---|---|---|
| 60 | RINSE | EVACUATION | REPRESS | FEED |
| 62 | EVACUATION | REPRESS | FEED | RINSE |
| 64 | REPRESS | FEED | RINSE | EVACUATION |

TIME ⟶

ADSORPTIVE SEPARATION UTILIZING MULTIPLE ADSORPTION BEDS

The present application is a continuation-in-part of U.S. Ser. No. 138,983 filed Dec. 29, 1987, now U.S. Pat. No. 4,813,977 issued Mar. 21, 1989.

TECHNICAL FIELD

The present invention is directed to the field of vacuum swing adsorptive separation of gas mixtures. Specifically, the present invention is directed to vacuum swing adsorptive separation of air to produce a nitrogen product of high purity, or separations of carbon oxides from impurities to recover the carbon oxides as high purity products, or lower alkyls from refinery gas.

BACKGROUND OF THE PRIOR ART

The prior art is well developed in the field of gas separations using adsorptive beds, wherein a more selectively adsorbed key gas specie is retained on the beds while a less selectively adsorbed secondary gas specie is allowed to pass through the bed. Adsorptive separation techniques allow for the separation and recovery of an individual product, dual products, or potentially in combination with a complex arrangement of adsorptive beds, multiple products can be obtained.

Various techniques for separation of air to recover nitrogen, oxygen or nitrogen and oxygen are known in the prior art.

In U.S. Pat. No. 4,013,429 a process is set forth for the adsorptive separation of air using two parallel sets of beds including pretreatment beds for the removal of water and carbon dioxide and main beds for the selective adsorption of nitrogen product. This process utilizes a series of pressure or volume variable receiving vessels, which constitute an expense and an operational liability. In addition, this process utilizes both compressors and vacuum pumps, which require power input for both. Finally, the process utilizes segregated pretreatment and main beds for differential regeneration.

A similar system is disclosed in U.S. Pat. No. 3,957,463. This process is for recovery of oxygen. The process requires an expansible oxygen receiver, as well as compression feed equipment and vacuum desorption equipment.

In U.S. Pat. No. 4,144,038 an adsorptive separation of argon, which is unadsorbed, from adsorbed oxygen and nitrogen is performed in a process which precludes the use of rinse or purge gas and performs feed by the vacuum of an unadsorbed product compressor at the effluent end of the adsorptive beds.

In U.S. Pat. No. 4,264,340, a process is disclosed for the recovery of product nitrogen which has been dried and cleaned of carbon dioxide and hydrocarbons. Again, compression feed, vacuum recovery and expansible receivers are an integral part of the process.

In addition various techniques are known for separating carbon oxides from impurities or other product quality gases as identified in U.S. Pat. Nos. 4,770,676; 4,705,541; 4,000,990 and 4,077,779.

The present invention overcomes the disadvantages of the prior art by avoiding power consumption of feed gas compression and the need for capital intensive and operational limiting storage vessels in a process as will be set forth below utilizing vacuum swing adsorption.

BRIEF SUMMARY OF THE INVENTION

The present invention is directed to a process for the production of a high purity more selectively adsorbed key component from a gas mixture containing the key component and one or more less selectively adsorbed secondary components using a plurality of parallel adsorption beds which comprises, drawing the gas mixture through the feed end of the first bed of adsorbent by connecting the effluent end of said bed to the effluent end of a parallel bed, which is presently fully evacuated, so as to selectively adsorb the key component on said first bed of adsorbent and allow the one or more secondary components to pass through said first bed, cocurrently rinsing said first bed with high purity key component to remove any co-adsorbed secondary component or void space secondary component from said bed, countercurrently desorbing said first bed by pressure reduction in one or more stages to a subatmospheric pressure to recover rinse gas for another of said plurality of beds presently undergoing the rinse step and the high purity key component product, countercurrently repressurizing said first bed by connecting the effluent end of said first bed at its subatmospheric pressure at the end of the desorption step with the effluent end of another of said plurality of beds presently undergoing the adsorption step and continuing this series of steps with the plurality of beds to form a continuous process for production of high purity key component.

Preferably the key component recovered from one parallel bed undergoing desorption is used in part directly as rinse gas for another of the parallel beds undergoing the rinse step.

Preferably any water and carbon dioxide contained in the feed gas mixture is adsorbed in an initial portion of the adsorbent packing in the plurality of parallel beds, wherein the initial portion of the adsorbent contains an adsorbent specific to the selective removal of water and carbon dioxide in contrast to the remainder of the bed, which is packed with an adsorbent selective to the adsorption of the key component over the one or more secondary components.

The gas mixture feed is preferably conducted over a pressure variation range of from approximately 12.7 psia to approximately 14.7 psia. The evacuation step is performed down to a vacuum level of approximately 50–250 torr.

The key component product derived from the process will preferably have a purity of at least 95.0% and up to approximately 99.9%. Preferably, four parallel adsorptive beds are utilized. Alternatively, three parallel adsorptive beds are utilized.

Preferably, the four steps of the process comprising feed, rinse, evacuation and repressurization occupy an equal period of time in the overall process. Alternatively, an idle step is included after repressurization, such that the feed and rinse step, as well as the repressurization and idle step, are equal in time duration as the evacuation step.

Alternatively, at least a minor amount of secondary component product can be recovered from the process.

The key component can be nitrogen, carbon dioxide, carbon monoxide or lower alkyls ($C_{2+}$). When the key component is nitrogen, the secondary component is oxygen in air. When the key component is carbon dioxide, the secondary components are one or more of carbon monoxide, methane, hydrogen, nitrogen, oxygen, or argon such as in flue gas, land fill gas or an adsorption offgas from reforming. When the key component is carbon monoxide, the secondary components are one or more of methane, hydrogen, nitrogen or oxygen such as reformer offgas, methanol disassociation gas, basic oxygen furnace offgas or any carbon monoxide offgas. When the key component is lower alkyl, such as $C_{2+}$ (ethane ethylene, propane, propylene, butane or butylene and various isomers), the secondary components are methane and hydrogen.

The appropriate adsorbent for the key component of carbon dioxide is sodium X zeolite; for carbon monoxide it is calcium 5A zeolite; and for lower alkyls it is sodium X zeolite or activated carbon.

BRIEF DESCRIPTION OF THE DRAWINGS

FIG. 3A illustrates a cycle sequence for the three bed system of FIG. 2.

FIG. 3B illustrates a cycle sequence for the four bed system of FIG 1.

DETAILED DESCRIPTION OF THE INVENTION

Figure 1:
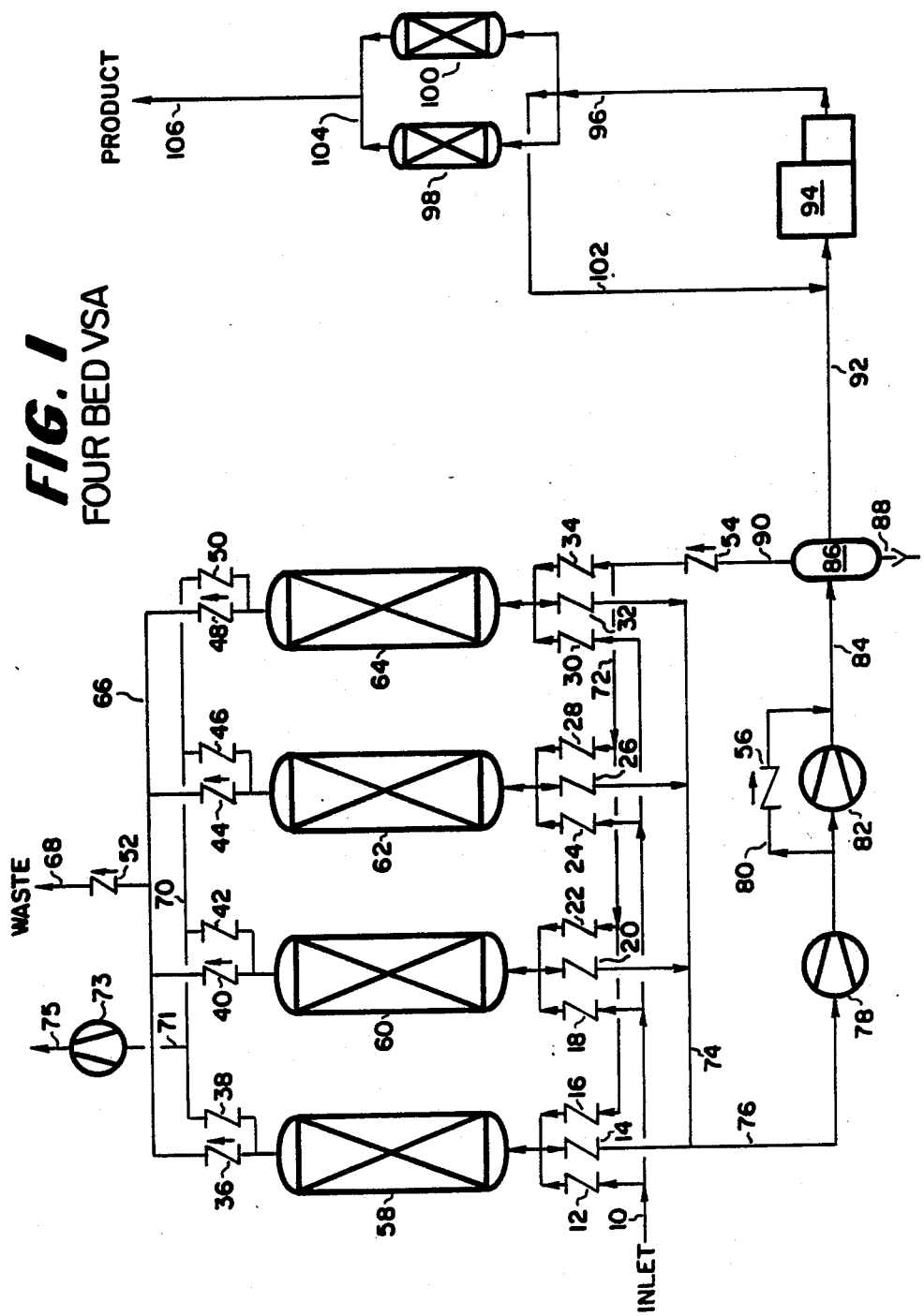
FIG. 1 is a schematic depiction of a preferred embodiment of the present invention. This embodiment utilizes four parallel adsorptive beds and a product drying step.

The present invention overcomes the problem of producing low cost key components such as nitrogen, carbon dioxide, carbon monoxide or lower alkyls in an adsorptive separation. Typically such key component production is both energy and capital intensive. Adsorptive processes for producing such key components in the past have experienced difficulty in control and efficiency in utilization of power. In the field of pressure swing adsorption, the subfield of vacuum swing adsorption is particularly attractive wherein the process is run between ambient pressure and a certain lower vacuum pressure. Vacuum swing adsorption is more energy efficient than pressure swing adsorption at elevated pressures wherein vacuum swing adsorption requires, for example, 0.75 kwh per 100 scf of nitrogen (at a product pressure of 30 psig) in comparison to the energy requirements of the pressure swing adsorption of 1.2 kwh/100 scf of nitrogen.

The present invention, constituting the more power efficient vacuum swing adsorption type, has several advantages over the prior art including the elimination of pretreatment and main beds as separate vessels with the concurrent avoidance of separate repressurization steps. It also eliminates the need for an extended evacuation of the pretreatment adsorbent to insure complete removal of carbon dioxide and water. In addition, the present invention eliminates the need for a secondary component storage tank and optionally can reduce the requirements for a key component storage tank. Most importantly, the present invention avoids the capital cost and power requirements of a feed blower or feed compressor by using the vacuum in an adsorptive bed being repressurized to draw feed gas mixture into the bed on feed, such that the feed step is operated over much of its cycle under subambient pressure conditions. The process results in a system which can produce 95.0% purity key component and, preferably, 99.9% purity key component product. The several embodiments of the present invention wherein a blower is avoided produce key component, such as nitrogen, at significantly lower specific powers than the prior art as represented by U.S. Pat. No. 4,013,429. The process of the present invention as set forth in FIG. 1 has a specific power of 0.45 kwh/100 scf of 99.0% nitrogen at 0 psig, or 0.60 kwh/100 scf at 30 psig. The present invention as embodied in FIG. 2 has a specific power of 0.47 kwh/100 scf of 99.0% nitrogen at 0 psig. In contrast, the prior art as represented by U.S. Pat. No. 4,013,429 has a specific power of 0.60 kwh/100 scf of 99.0% nitrogen at 0 psig. Accordingly, it can be seen that the present invention, with the avoidance of a feed blower and the use of the vacuum compressor to conduct at least a portion of the evacuation and supply of the gas mixture feed as well as rinse gas, along with the elimination of storage vessels, provides a unique process for producing high purity key component at low capital cost and low power requirements.

The process of the present invention is particularly attractive to a number of feed gas mixtures preferably at low or ambient gas pressure and generally having moderate to low selectivity with regard to key and secondary components over the chosen adsorbent. Key components are the most desired product component of the gas mixture to be resolved and are most readily or selectively adsorbed by the adsorbent in relation to the particular gas mixture's one or more secondary components. The gas mixtures are set forth in Table 1 below.

TABLE 1

| Gas Mixture | Key Component | Secondary Components | Adsorbent |
| --- | --- | --- | --- |
| Flue gas Landfill gas Reformer Adsorber Offgas | $CO_2$ | CO, $CH_4$, $H_2$, $N_2$, $O_2$, Ar | NaX |
| CO-offgas Reformer Offgas Methanol Disassociation Gas Basic Oxygen Furnace Offgas | CO | $CH_4$, $H_2$, $N_2$, $O_2$ | Ca5A |
| Refining Offgas | $C_{2+}$ | $CH_4$, $H_2$ | NaX, Activated Carbon |
| Air | $N_2$ | $O_2$ | CaX |

The present invention will now be described in greater detail with reference to the air separation embodiment illustrated in FIG. 1. Inlet ambient air possibly containing water and carbon dioxide is drawn in through line 10 into open valve 12 to be passed through adsorption bed 58 which is packed in its initial, or in this instance, lower portion with a water and carbon dioxide selective adsorbent such as alumina, silica gel or a zeolite, such as Na-X and is packed in its remaining portion or upper region with a nitrogen selective adsorbent such as a zeolite, such as CaX. The air is drawn through bed 58 by connection of that bed through open valve 38 and open valve 50 via line 70 with bed 64, which has just finished evacuation down to a pressure of approximately 150 torr and is now ready for repressurizing. As the air is drawn through bed 58, line 70 and into bed 64, the air is cleaned of water and carbon dioxide, nitrogen is preferentially and selectively adsorbed out of the air on the adsorbent and oxygen enriched gas passes through line 70 as a repressurization gas into bed 64 to raise its pressure ultimately to approximately ambient pressure conditions. Optionally, a minor amount of oxygen enriched gas, up to 10% of the nitrogen product, can be recovered from line 70 in line 71 by pulling oxygen through vacuum compressor 73 to be recovered as an oxygen-enriched product in line 75. At a fixed time set to avoid a nitrogen breakthrough at the effluent end of bed 58 and full repressurization of bed 64, ambient air feed is terminated and repressurization is also terminated.

At this point in time, bed 58 containing water, carbon dioxide, nitrogen, a small amount of co-adsorbed oxygen and a small amount of oxygen present in the voids space between the adsorbent particles is rinsed cocurrently with high purity nitrogen gas. The nitrogen rinse is introduced into the influent end of bed 58 through open valve 16 via line 72 and one-way valve 54 from line 90 and nitrogen storage vessel 86, which is supplied via line 84 from the evacuation compressors 78 and 82. The nitrogen rinse passes cocurrently through bed 58 to flush out coadsorbed oxygen and voids space oxygen through one-way valve 36 and line 66, wherein the rinse effluent with oxygen contamination is passed through open valve 52 and discharged as a vent waste stream 68.

This nitrogen rinse is derived from bed 60, which has previously undergone a rinse step and is simultaneously being evacuated through open valve 20 and line 74 by the vacuum suction of vacuum compressors 78 and 82, the latter of which is supplied with a by-pass circuit 80 and one-way valve 56, wherein high purity nitrogen of at least 95% nitrogen purity, preferably 99.9% nitrogen purity, is removed in line 84 and supplied to nitrogen storage tank 86. A portion of this nitrogen is used as rinse in bed 58 by passage through line 90 as described above. A certain amount of water is condensed at the higher pressure and is removed through line 88. The remaining high purity nitrogen is removed as product in line 92. When conditions dictate product at elevated pressure and low water or carbon dioxide content, the nitrogen product can be pressurized in compressor 94 and delivered via line 96 to alternating desiccant beds 98 and 100 operated in a known manner wherein dry, pressurized nitrogen is removed in line 104 as product 106. These desiccant beds can be regenerated in any one of a number of ways such as using a dry purge gas, by pressure swing regeneration or by thermal regeneration or a combination of those regenerations. Such a drying step is described in U.S. Pat. No. 4,264,340, the specification of which is incorporated herein by reference.

Bed 58, having just finished rinse for the removal of oxygen contamination, is next placed under countercurrent evacuation ultimately to a subatmospheric pressure of approximately 150 torr to recover high purity nitrogen product and rinse gas to be used for another of the plurality of beds, one of which is undergoing rinse. This evacuation is conducted by opening valve 14 and drawing nitrogen-rich gas countercurrently through line 76 via evacuation compressors 78 and 82, wherein nitrogen is delivered via line 84 to nitrogen storage vessel 86 for nitrogen rinse and nitrogen product, as stated above. While bed 58 is undergoing evacuation, a portion of its nitrogen product is transferred via line 90 and open valve 54 and 34 to provide cocurrent nitrogen rinse to bed 64 which has just come off the air feed step. When bed 58 has reached its fixed time evacuation schedule and arrived at the predesigned vacuum level during that fixed time evacuation, the valve 14 is then closed.

Vessel 58 is then at a subatmospheric pressure of approximately 150 torr and is then used to draw feed ambient air through another vessel by connecting the effluent end of bed 58 with the effluent end of bed 60. This pressure equalization induces repressurization of bed 58 and draws the feed air through bed 60, which has just previously been repressurized. This pressure equalization constituting repressurization and feed air respectively for the two beds, is accomplished by opening valve 38 and valve 42 to allow the vacuum in bed 58 to pull air through bed 60 and line 70 to repressurize bed 58 with oxygen enriched effluent and adsorb nitrogen out of the air being pulled through bed 60 via open valve 18 and line 10. At the end of a fixed time period designed to fully repressurize bed 58 and to avoid nitrogen breakthrough in bed 60, the valves 38 and 42 are closed. This describes a full cycle sequence for bed 58 with corresponding simultaneous functions with the interrelated parallel beds 60, 62 and 64. It is appreciated that with respect to FIG. 1 and FIG. 3B, each of the beds undergoes a similar sequence of adsorption steps in interrelation with one another. This can be further appreciated from the valve chart, Table 2, illustrated below.

TABLE 2

Four Bed Valve Sequence (FIG. 1)

| | BED STEP | | | | VALVES | | | | | | | | | | | | | | | | | | |
|---|---|---|---|---|---|---|---|---|---|---|---|---|---|---|---|---|---|---|---|---|---|---|---|
| | 1 | 2 | 3 | 4 | 12 | 14 | 16 | 36 | 38 | 18 | 20 | 22 | 40 | 42 | 24 | 26 | 28 | 44 | 46 | 30 | 32 | 34 | 48 | 50 |
| 0–60 | AF | RINSE | EVAC | REP | O | C | C | C | O | C | C | O | O | C | C | O | C | C | C | C | C | C | C | O |
| 60–120 | RINSE | EVAC | REP | AF | C | C | O | O | C | C | O | C | C | C | C | C | C | O | O | C | C | C | C | O |
| 120–180 | EVAC | REP | AF | RINSE | C | O | C | C | C | C | C | C | C | O | O | C | C | C | O | C | C | O | O | C |
| 180–240 | REP | AF | RINSE | EVAC | C | C | C | C | O | O | C | C | C | O | C | C | O | O | C | C | O | C | C | C |

O = Valve Open
C = Valve Closed

Figure 2:
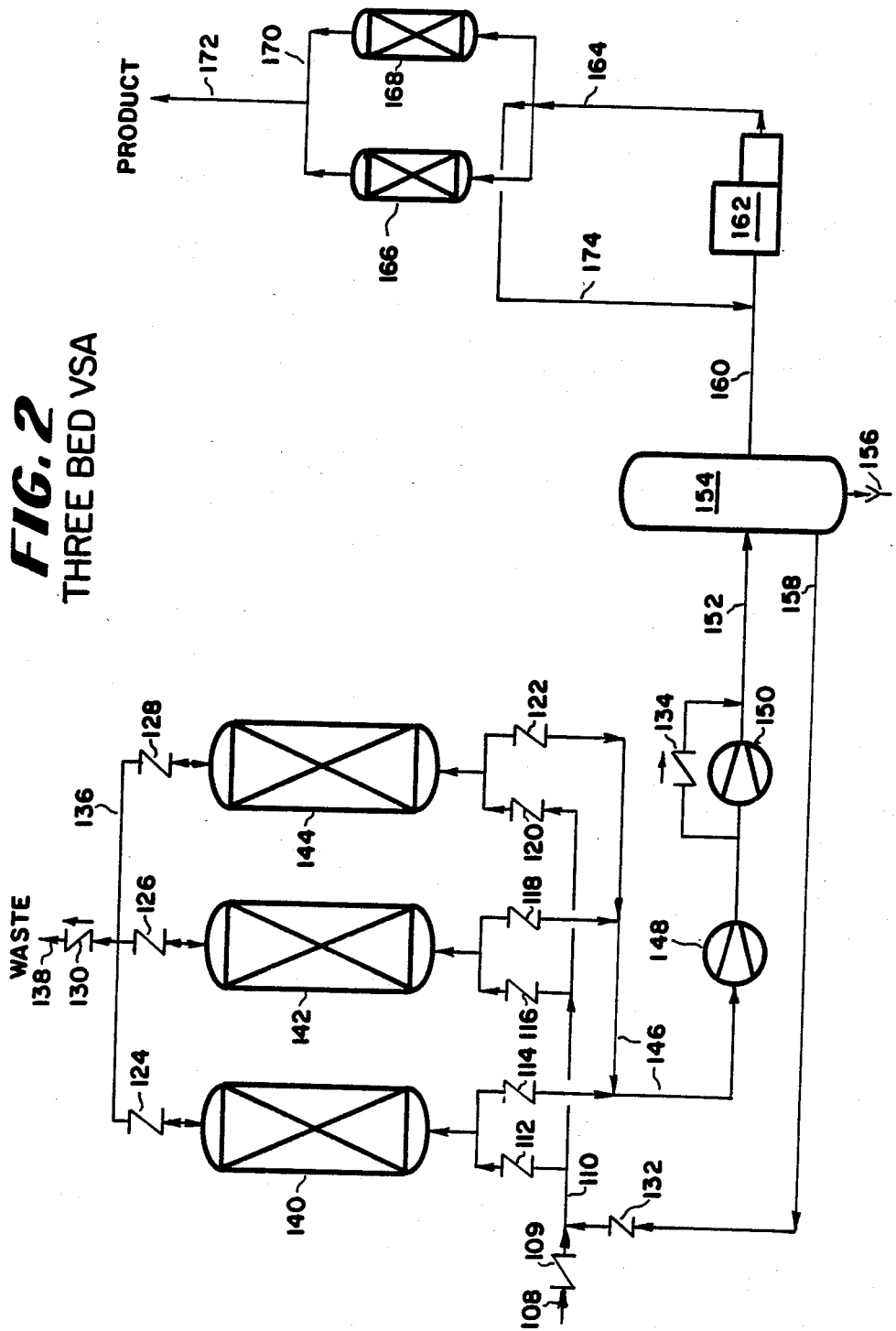
FIG. 2 is a schematic representation of an alternate embodiment to the present invention utilizing three parallel adsorptive beds. This embodiment utilizes a key component storage vessel and product drying step.

An alternate embodiment of the process of the present invention is illustrated in FIG. 2 and described with reference to the recovery of a nitrogen key component from an air gas mixture containing oxygen as the secondary component. The process of this alternate embodiment is similar to that of the preferred embodiment, but the cycle sequence includes an idle step, such that the combined steps of air feed and rinse and the combined steps of repressurization and idle are time equivalent to the evacuation step of the various beds. This alternate embodiment will now be described with reference to FIG. 2. Inlet ambient air 108 is introduced through valve 109 and manifold 110. This ambient air is drawn through open valve 112 and into a first adsorbent bed 140 which is packed with an initial or influent portion of water and carbon dioxide selective adsorbent and subsequently in its second or downstream portion with a nitrogen selective adsorbent. The ambient air feed is drawn through bed 140 by having it pressure equalize with a connected, subatmospheric repressurizing bed via open valve 124, manifold 136, valve 126 and repressurizing bed 142. Bed 142 has just previously been evacuated to a lowest most pressure of approximately 150 torr and, during repressurization, reduces the pressure on bed 140, inducing air feed through bed 140 and simultaneous repressurization of bed 142 with oxygen enriched gas from the effluent end of bed 140. This accomplishes countercurrent repressurization of bed 142.

On a fixed time basis the air feed of bed 140 and repressurization of bed 142 are terminated on a basis such that nitrogen does not break through the effluent end of bed 140 and bed 142 is repressurized to approximately feed air pressure conditions. Bed 140 is then rinsed with a high purity nitrogen gas cocurrently in order to remove co-adsorbed oxygen and void space oxygen by passing nitrogen into the influent end of bed 140 cocurrently through valve 112, manifold 110 and open valve 132, which delivers nitrogen via line 158 from a nitrogen storage tank 154. This nitrogen displaces oxygen contaminated gas or rinse effluent through open valve 124 and open valve 130 to be vented as waste 138.

After a fixed time period sufficient to remove oxygen content from bed 140, rinse is discontinued and bed 140 is evacuated countercurrently to a subambient pressure level of approximately 150 torr by opening valve 114 and drawing previously adsorbed nitrogen through line 146 by means of vacuum compressors 148 and 150. The second stage of vacuum compression can be by-passed through valve 134. This nitrogen is delivered via line 152 to the nitrogen storage tank 154, which stores nitrogen product and nitrogen rinse for recovery of high purity nitrogen and dispensing of nitrogen rinse, which is recycled to the particular adsorbent bed undergoing rinse. Due to compression, some water and condensibles can be removed from the nitrogen storage tank 154 through line 156.

During the evacuation step of bed 140, a portion of the evacuated gas is used as product, while a second portion is recycled as rinse to a rinsing bed. The nitrogen product, preferably having a purity of 95% and having a maximum purity of 99.9%, can be removed in line 160 and, if product specifications require, compressed in compressor 162 and delivered via line 164 to a switching series of desiccant beds 166 and 168 for removal of water wherein the ultimate nitrogen product delivered via line 170 is removed as a pressurized, dry, nitrogen gas 172. A recycle line 174 allows any nitrogen product used to regenerate beds 166 and 168 to be recovered. These beds may be regenerated in any of the known techniques as fully described with reference to the embodiment of FIG. 1 above.

After the fixed time evacuation of bed 140 is completed, the bed is at its lowest pressure level at a subambient condition, preferably of 150 torr. It is now necessary to repressurize bed 140 to bring it to feed conditions. Bed 140 is repressurized with oxygen enriched effluent introduced countercurrently through open valve 124 via line 136 and open valve 128, which allows pressure equalization between the vacuum condition of bed 140 and the repressurized condition of bed 144. Accordingly, air 108 is introduced through open valve 109 and manifold 110 via open valve 120 through bed 144, which is presently on ambient air feed and the resulting oxygen rich effluent passes to bed 140 by the driving force of pressure equalization between the high pressure bed 144 and the vacuum pressure bed 140. After a fixed time interval which is calculated to avoid nitrogen breakthrough in bed 144 and to provide for approximately full repressurization of 140, the repressurization step is discontinued and bed 140 exists in an idle step having no active function for a fixed time prior to returning to the above-described ambient air feed step.

This completes the description of a full cycle sequence for bed 140 and it can be appreciated that each of the beds 140, 142 and 144 go through a similar sequence of steps commensurate with the cycle sequence illustrated in FIG. 3A to provide a continuous process as will be more fully appreciated from review of the valve chart for the alternate embodiment of FIG. 2 set forth in Table 3 below.

TABLE 3

Three Bed Valve Sequence (FIG. 2)

| | BED STEP | | | VALVES | | | | | | | | | |
|---|---|---|---|---|---|---|---|---|---|---|---|---|---|
| | 1 | 2 | 3 | 112 | 114 | 124 | 116 | 118 | 126 | 120 | 122 | 128 | 109 | 132 |
| 0–45 | AF | EVAC | REP | O | C | O | C | O | C | C | C | O | O | C |
| 46–60 | RINSE | EVAC | IDLE | O | C | O | C | O | C | C | C | O | C | O |
| 60–105 | EVAC | REP | AF | C | O | C | C | C | O | O | C | O | O | C |
| 105–120 | EVAC | IDLE | RINSE | C | O | C | C | C | O | O | C | O | C | O |
| 120–180 | REP | AF | EVAC | C | C | O | O | C | O | C | O | C | O | C |
| 165–180 | IDLE | RINSE | EVAC | C | C | O | O | C | O | C | O | C | C | O |

O = Valve Open
C = Valve Closed

Although the process of the present invention has been set forth with reference to three and four bed configurations, it is also possible to use a five bed configuration and split the desorption step into two steps, a depressurization substep to ambient pressure with the desorbed key component used as rinse gas for a parallel bed and an evacuation substep to a subatmospheric pressure with the evacuated gas used as key component product.

In addition, in any of the embodiments if the key component is valuable because of its pressure or intrinsic value, the rinse gas effluent after performing its rinse function can be recycled to be mixed with the feed gas mixture.

In most instances the feed gas mixture pressure will be at or less than 10 psig, preferably at or less than 5 psig, optimally at or less than ambient pressure.

The improved process of the present invention dispenses with much of the hardware and power requirements of the prior art in providing a vacuum swing adsorptive separation of gas mixtures to produce a high purity key component product. By further downstream processing, this high purity key component product can be set to desired product pressure specifications and dried for those end uses which require such contaminant removal. The overall effect of the present process with its avoidance or reduction of surge tank requirements for products and by-products and the absence of a feed blower or compressor, is at least a 3% reduction in capital investment in such a plant and a 5% to 13% reduction in power consumption based upon a 30,000 scf/hr air separation plant size producing dry 99.5% nitrogen at 100 psig. In addition, the use in the present process of a single adsorption bed per parallel train rather than a pretreatment bed and a main bed for removal of water, carbon dioxide and secondary component reduces capital cost of the process equipment while increasing production and simplifying cycle sequence by allowing single beds to be operated without dissimilar regeneration treatment.

The process of the present invention has been set forth with reference to several preferred embodiments, but the full scope of the invention should be ascertained from the claims which follow:

We claim:

1. A process for the production of high purity more selectively adsorbed key component from a gas mixture containing the key component and one or more less selectively adsorbed secondary components using a plurality of parallel adsorption beds which comprises:
   (a) drawing said gas mixture through the feed end of a first bed of adsorbent by connecting the effluent end of said bed to the effluent end of a parallel bed, which is presently evacuated, so as to selectively adsorb said key component on said first bed of adsorbent and allow said one or more secondary components to pass through said first bed;
   (b) cocurrently rinsing said first bed with high purity key component to remove any co-adsorbed secondary component and void space secondary component from said bed;
   (c) countercurrently desorbing said first bed by pressure reduction in one or more stages to a subatmospheric pressure to recover a rinse gas for another of said plurality of beds presently undergoing step (b) and a high purity key component product;
   (d) countercurrently repressurizing said first bed by connecting the effluent end of said first bed at its subatmospheric pressure at the end of step (c) with the effluent end of another of said plurality of beds presently undergoing the adsorption of step (a), and
   (e) continuing this series of steps with the plurality of beds to form a continuous process for production of high purity key component.

2. The process of claim 1 wherein the rinse gas recovered from one bed undergoing step (c) is directly used as the rinse gas of another bed undergoing step (b).

3. The process of claim 1 wherein step (c) has two stages, a first stage ending at ambient pressure in which the desorbed gas is used to rinse a parallel bed and a second stage ending at said subatmospheric pressure in which the desorbed gas is key component product.

4. The process of claim 1 wherein any water and carbon dioxide contained in the gas mixture is adsorbed in an initial portion of the adsorbent of said plurality of beds.

5. The process of claim 4 wherein each adsorbent bed contains an adsorbent selective for water and carbon dioxide in the initial portion of the bed adjacent to the influent end and an adsorbent selective for the key component in the remainder of the bed.

6. The process of claim 1 wherein the bed undergoing step (d) repressurization is repressurized to a pressure of approximately 14.7 psia.

7. The process of claim 1 wherein step (a) feed is conducted over a pressure variation from approximately 12.7 psia to approximately 14.7 psia.

8. The process of claim 1 wherein step (c) evacuation is conducted to a pressure of approximately 50-250 torr.

9. The process of claim 1 wherein the key component product has a purity of at least 95.0%.

10. The process of claim 1 wherein the key component product has a purity of approximately 99.9%.

11. The process of claim 1 wherein four parallel beds are utilized.

12. The process of claim 1 wherein key component recovered in step (c) is supplied to a key component storage vessel.

13. The process of claim 1 wherein each of the steps (a) feed, (b) rinse, (c) desorption and (d) repressurization is conducted in an equal period of time.

14. The process of claim 1 wherein an idle step follows the repressurization step in which said first bed is not involved in active operation.

15. The process of claim 14 wherein three parallel beds are utilized.

16. The process of claim 14 wherein the total of step (a) feed and step (b) rinse are of the same time duration as the step (c) desorption and the total of step (d) repressurization and said idle step are also of the same time duration as the step (c) desorption.

17. The process of claim 14 wherein key component recovered in step (c) desorption is supplied to a key component storage vessel.

18. The process of claim 1 wherein a portion of the secondary component passing through said first bed in step (a) is recovered as a secondary component product.

19. The process of claim 1 wherein five parallel beds are utilized.

20. The process of claim 1 wherein the effluent from the rinse of step (b) is recycled and mixed with said gas mixture of step (a).

21. The process of claim 1 wherein the key component is selected from the group consisting of nitrogen, carbon dioxide, carbon monoxide or lower alkyl hydrocarbons ($C_{2+}$).

22. The process of claim 1 wherein the feed gas mixture pressure is at or less than 10 psig.

23. The process of claim 1 wherein the feed gas mixture pressure is at or less than 5 psig.

24. The process of claim 1 wherein the key component is carbon dioxide and the adsorbent is sodium X zeolite.

25. The process of claim 1 wherein the key component is carbon monoxide and the adsorbent is calcium 5A zeolite.

26. The process of claim 1 wherein the key component is a lower alkyl and the adsorbent is sodium X zeolite or activated carbon.

27. The process of claim 1 wherein nitrogen is the key component and the adsorbent is calcium X zeolite.

28. The process of claim 1 wherein step (b) is followed by cocurrent depressurization to approximately 14.7 psia.

* * * * *